J. H. LEWIS & A. D. WEST.
Whiffletrees.
No. 151,990. Patented June 16, 1874.
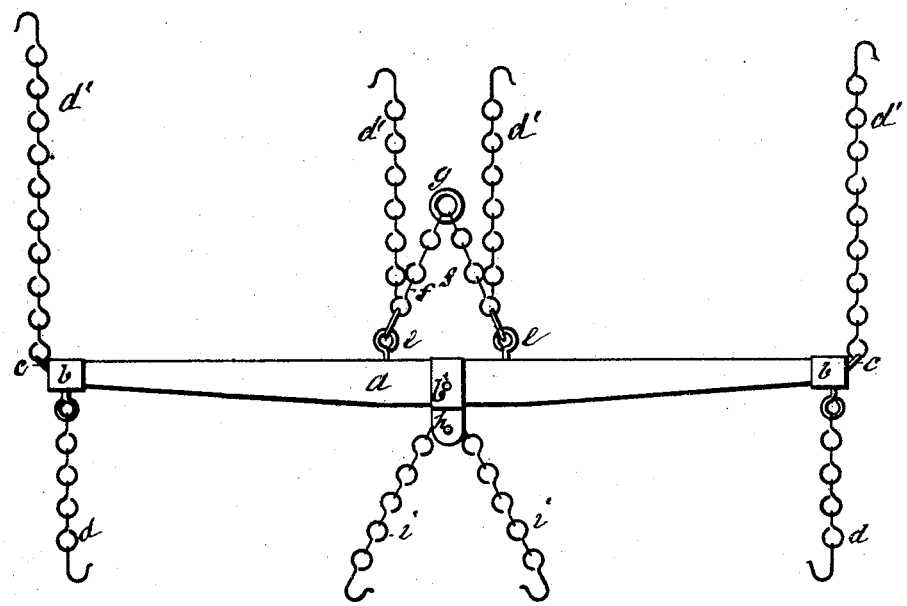
Witness.
W. E. Burdick
Inventor.
Jonathan H. Lewis
Albert D. West
By Jeremy W. Bliss

UNITED STATES PATENT OFFICE.

JONATHAN H. LEWIS AND ALBERT D. WEST, OF ROCKVILLE, CONN.

IMPROVEMENT IN WHIFFLETREES.

Specification forming part of Letters Patent No. 151,990, dated June 16, 1874; application filed March 28, 1874.

*To all whom it may concern:*

Be it known that we, JONATHAN H. LEWIS and ALBERT D. WEST, of Rockville, county of Tolland and State of Connecticut, have jointly invented certain new and useful Improvements in Double Whiffletrees; and to enable others skilled in the art to make and use the same, we will proceed to describe, referring to the drawings, in which the same letters indicate like parts in each of the figures.

The object of this invention is to obviate the annoyance of chains, traces, and whiffletrees dangling about the legs of animals.

The nature of this invention will be fully understood from the specification and drawing, in which—

$a$ is a double whiffletree, designed to be used with two animals for plowing, or for other draft work. When made of wood it is provided in the center and at each end with metal bands $b$, and loops or links $c$, to which the supporting straps or chains $d$ are secured. $e$ are loop or link bolts, secured firmly in the whiffletree a little distance each side of the center, for the purpose of receiving and securing the supporting straps or chains $d'$; also, to receive and secure one end of the draft-chains $f$. This whiffletree is supported under the body of the animal, just back of the front legs, by securing the ends of the straps or chains $d$ to the hames-ring, or strong buckle of the harness each side of each animal in front, and the strap or chain $d'$ to the breeching-ring near the hip, each side of each animal. The draft-chain is designed to be secured to the ring $g$.

It will be particularly noticeable that the center band $b'$ of the whiffletree is provided with a sheave, $h$, over which the chain $i$ traverses to more perfectly equalize the draft between the two animals.

Thus it will be seen that the whiffletree is entirely removed from the legs or feet of the animals, and is so arranged and suspended that the draft-chain will be in a direct line from the breasts of the animals, and that the draft will be equalized between them, thus greatly facilitating the work to be performed over the old way heretofore in use.

What we claim, and desire to secure by Letters Patent, is—

The sheave $h$, traverse-chain $i$, and link-bolts $e$, in combination with the whiffletree $a$ and supporting straps or chains $d$ and $d'$, substantially as and for the purpose set forth.

JONATHAN H. LEWIS. [L. S.]
ALBERT D. WEST. [L. S.]

Witnesses:
H. E. BLAKESLEE,
JEREMY W. BLISS.